United States Patent [19]
Natale et al.

[11] Patent Number: 5,274,129
[45] Date of Patent: Dec. 28, 1993

[54] HYDROXAMIC ACID CROWN ETHERS

[75] Inventors: Nicholas R. Natale; Chien M. Wai; Sadik Elshani, all of Moscow, Id.

[73] Assignee: Idaho Research Foundation, Inc., Moscow, Id.

[21] Appl. No.: 714,265

[22] Filed: Jun. 12, 1991

[51] Int. Cl.⁵ .......................................... C07D 323/00
[52] U.S. Cl. ..................................... 549/349; 549/353
[58] Field of Search ................................ 549/349, 353

[56] References Cited

U.S. PATENT DOCUMENTS 4,421,923 12/1983 Bartsch .................................. 549/349
4,938,790  7/1990 Smith et al. ........................... 549/349
4,979,978 12/1990 Renga et al. .......................... 549/349

Primary Examiner—C. Warren Ivy
Assistant Examiner—Raymond Covington
Attorney, Agent, or Firm—Leydig, Voit & Mayer

[57] ABSTRACT

Novel derivatives of hydroxamic acid chelating agents for the chelation of f-block elements, yttrium and scandium and methods for the extraction of such elements.

36 Claims, No Drawings

HYDROXAMIC ACID CROWN ETHERS

FIELD OF THE INVENTION

The present invention relates to chelating agents, and, more particularly, to derivatives of hydroxamic acid as chelating agents for the chelation of f-block elements, scandium and yttrium and to methods for the separation and recovery of f-block elements, scandium and yttrium by solvent extraction.

DESCRIPTION OF THE PRIOR ART

The technological importance of chelation has long been recognized. Chelating agents provide a means for manipulating and controlling metal ions by forming with the metal, complexes that typically have properties markedly different from the metal ion or the chelant. Some uses of chelation technology include water softening, ore leaching, chemical analysis and the extraction and recovery of metals from aqueous media.

For example, the liquid-liquid extraction of rare-earth metals from water is well known. In one such process, an organic stream immiscible with water is flowed counter-current to the aqueous mixture which contains the rare-earth metal. Chelating agents are typically used in the organic phase to complex with the rare-earth metal in the aqueous phase to extract the metal from the aqueous phase.

The complexing properties of crown ethers and the metal cation binding properties of various crown ethers as determined by solvent extraction methods is also known. In such systems, the lipophilic nature of the counteranion has been shown to include the extractibility of the metal ion-crown ether pair into an organic solvent. Macrocyclic hosts are also known chelating agents. With a macrocyclic host, the need to extract an aqueous-phase anion is eliminated.

Recently, it has been reported that a crown ether carboxylic acid (sym-dibenzo-16-crown-5-oxyacetic acid) was used effectively to extract lanthanides from aqueous solutions into an organic phase with high efficiency and selectivity. J. Tang and C. M. Wai, *Anal. Chem.* 1986, 58, 3233. It is also known that macrocycles containing hydroxamic moieties are complexing agents for the transportation of ions in living organisms. For example, open chain compounds called sidesophores, such as naturally occurring desferriferrioxamine E is known to complex iron (III) ion. *Development of Ion Chelators for Clinical Use*, A. E. Martell, W. F. Anderson, D. G. Badman, Elseries, North Holland, N.Y. 1981, pp. 13-31 and 102-108.

While the crown-ether carboxylates have been shown to be useful in the extraction of lanthanides, they are not entirely satisfactory. Moreover, derivatives of hydroxamic acid have not been known heretofore to be suitable as complexing agents for f-block elements, yttrium and scandium. There thus remains a need for chelating agents which are capable of extracting from aqueous media f-block elements, that is elements of the lanthanide series and the actinide series of the Periodic Table and yttrium and scandium more efficiently than the carboxylates and that exhibit satisfactory selectivities between the elements within these series of elements.

Accordingly, it is a primary object of the present invention to provide a chelating agent capable of complexing with elements of the lanthanide and actinide series of the Periodic Table, and with scandium and yttrium.

It is another object of the invention to provide chelating agents capable of complexing with elements of the lanthanide and actinide series of the Periodic Table and which can be used to extract such elements from aqueous media. A related object is to provide chelating agents that are more efficient than carboxylates for the extraction of the f-block elements. A still further and related object is to provide a chelating agent that exhibits selectivity for the f-block elements.

It is a further object of the invention to provide chelating agents capable of complexing with yttrium and scandium and which can be used in the selective extraction of these elements.

It is another object of the present invention to provide a method for the extraction of f-block elements from aqueous media. It is a more specific object to provide a method for the extraction of f-block elements from ground water, including potable water. It is a related object to provide a method for the clean-up of hazardous waste by the extraction of f-block elements.

It is another object of the present invention to provide a method for recovering f-block elements and yttrium and scandium from minerals and ores.

These and other objects of the invention will become apparent from the following detailed description of the preferred embodiment.

SUMMARY OF THE INVENTION

The present invention is predicated on the discovery that dibenzo ether derivatives of hydroxamic acid form metal-ion complexes with f-block elements, that is, elements in the lanthanide and actinide series of the Periodic Table, and with scandium and yttrium. The dibenzo ether derivatives of hydroxamic acid of the present invention may be cyclic, i.e., crown-ether derivatives, or acyclic, and may be mono, di or tri dentate. The hydroxamic acid derivatives are lipophilic to minimize partitioning of the chelating agent into the aqueous phase.

In accordance with another aspect of the present invention, methods are provided for the extraction of f-block elements from aqueous media and for the extraction of scandium and yttrium from aqueous media. Illustrative of the uses of the novel chelating agents of the present invention for the extraction of f-block elements from aqueous media include the concentration of f-block elements from sea water, removal of f-block elements from fresh water and potable water, and clean-up of hazardous waste.

DETAILED DESCRIPTION OF THE PREFERRED EMBODIMENTS

In one aspect, the dibenzo ether derivatives of hydroxamic acid of the present invention are described by the following empirical formula:

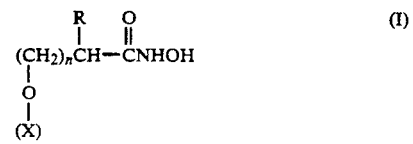

wherein n is an integer of from 0 to 6, X is a dibenzo crown ether of the formula dibenzo-[13+3m]-crown-[4+m]-ether wherein m is an integer of from 0 to about 5 or so and R is a lipophilic group which imparts lipophilicity to the hydroxamic acid derivative. The size of the dibenzo crown ether may be varied provided the metal to be extracted fits in the ring such that the donor atoms coordinate to the metal (or to water associated with the metal). However, crown ethers in which the ring size of the crown is too large for a satisfactory host/guest interaction are not suitable. The preferred dibenzo crown ethers are those in which m is 0, 1 or 2, and are, respectively, dibenzo-13-crown-4 ether, dibenzo-16-crown-5 ether and dibenzo-19-crown-6 ether.

Since the chelating agents of the present invention are useful for the extraction of metal ions of the lanthanide and actinide series and of yttrium and scandium from aqueous medium, the hydroxamic acid derivatives of this invention are preferably lipophilic in order to minimize or even prevent the chelating agent from partitioning in the aqueous phase. Generally, the greater the lipophilicity of the chelating agent the better the chelating agent will perform. Although R may be hydrogen, it is preferably a lipophilic moiety. Thus, R is a hydrocarbyl group having from 1 to about 18 carbon atoms and is selected from the group consisting of alkyl, cycloalkyl, alkenyl and aryl groups. These groups may also be substituted with other functional groups. For example, if aryl is phenyl, the phenyl may be substituted with electron withdrawing groups such as fluorine, or it may be substituted with electron donating groups such as methoxy. By way of illustration and not in limitation, the phenyl group may be completely substituted with fluorine, such that R is $C_6F_5$ or it may be a 3,5-ditrifluoromethyl phenyl group. Fluorinated derivatives of hydroxamic acid may find special utility in the extraction of lanthanide and actinide metal ions from supercritical fluids.

It has been found that R groups of from about 6 to about 10 carbon atoms are typically sufficiently lipophilic to minimize partitioning. It has also been found that, in general, higher extraction efficiency is achieved with R groups of greater lipophilicity, that is, where R is a longer chain hydrocarbon, and that hydroxamic acids in which the R group is aryl are often more selective.

In another aspect, the dibenzo ether derivatives of hydroxamic acid of the present invention are described by the following empirical formula:

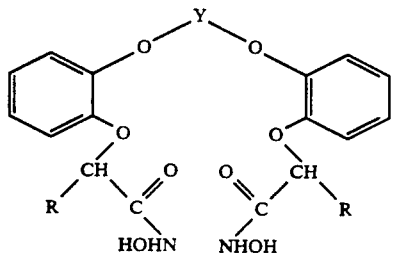

(II)

wherein Y is a member selected from the group consisting of $(CH_2)_3$,

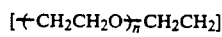

wherein n is an integer of from 1 to about 4, and $CH_2CONHCH_2CH_2NHCOCH_2$; and R, which may be the same or different, is selected from the group consisting of H, and a hydrocarbyl group having from 1 to about 18 carbon atoms and is selected from the group consisting of alkyl, cycloalkyl, alkenyl and aryl groups. As with the hydroxamic acid derivatives represented by formula (I), the R groups are preferably lipophilic so as to minimize partitioning of the chelating agent in aqueous medium. Further, as with the hydroxamic acid derivatives represented by formula (I) above, these groups may be substituted with other functional groups.

In yet another aspect, the present invention provides a bis-dibenzo crown ether derivative of a hydroxamic acid represented by the following empirical formula:

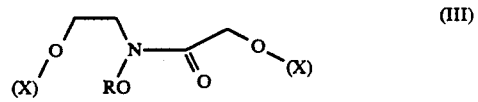

(III)

wherein X is a dibenzo crown ether of the formula dibenzo-[13+3m]-crown-[4+m]-ether and m is an integer of from 0 to about 5 or so, and R is hydrogen or a lipophilic hydrocarbyl group having from 1 to about 18 carbon atoms and is selected from the group consisting of alkyl, cycloalkyl, alkenyl and aryl groups. The R groups may be substituted with other functional groups. The dibenzo crown ether X may be the same or different and its size may be varied provided the metal to be extracted fits into the ring to permit chelation. The preferred dibenzo crown ethers are those in which m is 0, 1 or 2, and are, respectively, dibenzo-13-crown-4 ether, dibenzo-16-crown-5 ether and dibenzo-19-crown-6 ether.

The present invention further provides a tridentate derivative of a hydroxamic acid represented by the formula:

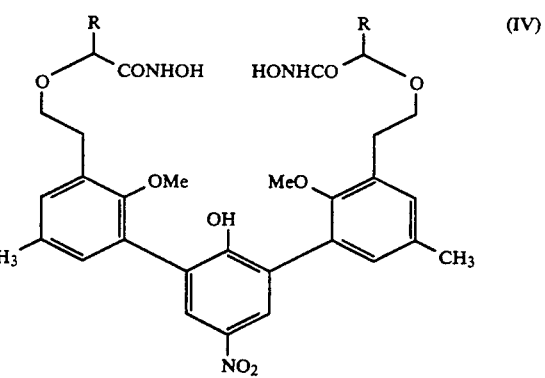

(IV)

R may be H, but preferably R is a lipophilic moiety having of from 1 to about 18 carbon atoms and is selected from the group consisting of alkyl, cycloalkyl, alkenyl and aryl groups. The R groups may be substituted with other functional groups.

The dibenzo crown ether derivatives of hydroxamic acid represented by formula (I) may be prepared, for example, by a two step synthesis. In the first step, a crown ether carboxylic acid derivative is prepared, as for example, by the method disclosed in R. A. Bartsch et al., *J. Org. Chem.* 1981, 46, 3574. According to this synthesis route, crown ether carboxylic acids are prepared from the corresponding sym-dibenzohydroxy crown ethers by reaction with 2-bromocarboxylic acid in tetrahydrofuran (THF) at room temperature and in the presence of NaH as a base. In the second step, crown ether hydroxamic acids are prepared in good yield in a series of three reactions from the corresponding carboxylic acid crown ethers. Crown ether carboxylic acids are converted first to their corresponding acid chlorides by reaction with oxalylchloride in dry benzene at 0° C., stirred at room temperature and finally at 60-70° C. Since acid chlorides are very reactive compounds and react very easily with water from mixtures, the crown acid chlorides are used without isolation. The reaction may be monitored in TLC.

The crown acid chlorides are then converted to crown O-benzyl hydroxamates by the reaction of the chlorides with O-benzylhydroxylamine hydrochloride in dry acetonitrile in the presence of pyridine as a base. The reactants are added at 0° C. and then the reaction mixture is stirred at room temperature for 24 hours.

The crown hydroxamic acid, which corresponds to the crown acid chloride precursor is prepared by hydrogenation of the crown O-benzyl hydroxamate in methyl hydroxide in the presence of a catalyst, preferably palladium on activated carbon. Hydrogenation time will depend, in part, on the chain length of the R group. For example, hydrogenation may be accomplished in as short as 3 hours for crown O-benzyl hydroxamates in which the chain length of the alkyl, cycloalkyl or aryl or phenyl groups is relatively short, i.e., on the order of one to about 6 carbon atoms. Hydrogenation is typically much longer for crown O-benzyl hydroxamates which contain long chain alkyl, cycloalkyl, aryl or phenyl groups. If the time of hydrogenation is prolonged, over-reduction takes place and an amide is obtained instead of hydroxamic acid. Over-reduction typically occurs in many of the syntheses, but in a very small amount without severe adverse affect.

Acyclic dibenzo crown ether derivatives of hydroxamic acid represented by formula (II), may be prepared by first forming an acyclic polyether dicarboxylic acid by the reaction of a bisphenol and a 2-bromocarboxylic acid in tetrahydrofuran (THF) in the presence of NaH at room temperature. An intermediate acid chloride is then formed by the reaction of the acyclic polyether dicarboxylic acid with oxalylchloride. The intermediate chloride is reacted with pyridine, to form the desired hydroxamic acid derivative.

Bis-dibenzo ether derivatives of hydroxamic acid, represented by formula (III), may be prepared according to the following procedure. Crown ether carboxylic acid is reacted in the presence of LiAlH4, TsCl with O-benzylhydroxylamine to form the crown O-benzyl hydroxamate. The crown O-benzyl hydroxamate is then reacted with crown-carboxylic acid chloride to give the bis-dibenzo product.

The hydroxamic acid derivative represented by formula (IV) may be prepared according to the following procedure. The compound represented by the formula (V) as follows:

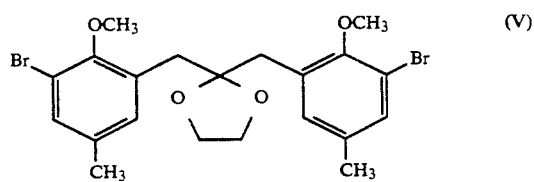

is reacted with t-butyl lithium so as to undergo halogen metal exchange. The reaction product is treated with dimethylformamide (DMF). The resulting dialdehyde intermediate is reacted with triphenylmethylene phosphorane, by the Wittig reaction. The diolefin product of the Wittig reaction then undergoes hydroboration oxidation with borane dimethylsulfide. The hydroxamic acid is then prepared according to the procedure set forth above for the compounds represented by formula (I). In the final step, the acetal is deprotected and the compound is reacted with nitromalondialdehyde to form the nitrophenol ring.

The following Examples are intended to further illustrate the invention which is described herein, and are not intended to limit the scope of the invention.

EXAMPLES 1-4

These Examples illustrate the preparation of crown ether carboxylic acids which are used as the precursors for the preparation of the corresponding hydroxamic acid derivatives of the present invention. The following procedure was used to prepare the crown ether carboxylic acids.

Dry THF (50 mL) was added to 1.2 g (50 mmol) of dry NaH under nitrogen. After the mixture was stirred for 30 minutes at room temperature, 3.46 g (10 mmol) of crown alcohol dissolved in 80 mL of THF was added for 1 hour. The reaction mixture was stirred for another hour after which 15 mmol of 2-bromocarboxylic acid dissolved in 80 mL of THF was added dropwise over a period of 10-12 hours. The stirring was continued another 12 hours at room temperature. Reaction flow was monitored on TLC and the starting material still was present. An additional 5 mmol of 2-bromocarboxylic acid dissolved in 20 mL of THF wa added during 1 hour, and the reaction mixture was stirred for 5-6 hours at room temperature. Water was carefully added to destroy the unconsumed NaH, and then THF was evaporated. The residue was added to 80-100 mL of water, acidified with 6M HCl and extracted with $CH_2Cl_2$. Organic layers were combined, washed with water and dried over $MgSO_4$ and evaporated in vacuo. The residue was a yellow-brown oil to which hexane was added. The mixture was placed in a refrigerator. The resultant white solid was filtered with suction, washed with hexane, dried and recrystallized from hexane to give pure white solids.

In these Examples, the crown alcohol was sym-dibenzohydroxyl-16-crown-5, prepared by the method of Bartsch et al. *J. Org. Chem.*, 1981, 46, 3574. In Examples 1 through 4, the 2-bromocarboxylic acids were, respectively, 2-bromododecanoic acid, 2-bromotetradecanoic acid, 2-bromohexadecanoic acid and 2-bromooctadecanoic acid.

In Example 1, 2-(sym-dibenzo-16-crown-5-oxy)-dodecanoic acid (m.p. 69°-70° C.) was obtained in 80% yield.

In Example 2, 2-(sym-dibenzo-16-crown-5-oxy)tetradecanoic acid (m.p. 78°-79.5° C.) was obtained in 66% yield.

In Example 3, 2-(sym-dibenzo-16-crown-5-oxy)hexadecanoic acid (m.p. 78°-80° C.) was obtained in 70% yield.

In Example 4, 2-(sym-dibenzo-16-crown-5-oxy)octadecanoic acid (m.p. 65.5°-67° C.) was obtained in 64% yield.

Hydroxamic acid derivatives corresponding to the carboxylic acid derivatives of Examples 1-4 may be prepared by first converting the carboxylic acid derivative to the acid chloride by reacting it with oxalylchloride, then coverting the acid chloride to O-benzylhydroxamate by reacting the acid chloride with O-benzylhydroxylamine hydrochloride and then hydrogenating the O-benzylhydroxamate.

EXAMPLE 5

This Example illustrates the preparation of 2-(sym-dibenzo-16-crown-5-oxy)phenylacetic acid.

To 6 equivalents of dry NaH, 40–50 mL of THF were added under nitrogen. After the mixture was stirred for 30 minutes at room temperature, 15 mmol (5.19 g) of crown alcohol dissolved in 100 mL of THF was added dropwise for 1 hour and was stirred for another hour. Then 22.5 mmol (4.83 g) of 2-bromophenylacetic acid dissolved in 100 mL of THF was added dropwise over 10–12 hours. The reaction mixture was stirred for 24 hours at room temperature. Water was added to destroy unconsumed NaH, and the THF was evaporated in vacuo. The residue was dissolved in 100 mL of water and then extracted with ether to remove unreacted crown alcohol. The water layer was acidified with 6M HCl and extracted with $CH_2Cl_2$. The $CH_2Cl_2$ layer was washed with water, dried with $MgSO_4$ and evaporated in vacuo to give a white crystalline solid. Recrystallization from ethylacetate in hexane gave 76% of white solid (m.p. 127°–128.5° C.).

EXAMPLES 6–10

These Examples illustrate the preparation of dibenzo-crown ether O-benzylhydroxamates from their corresponding carboxylic acids.

First, the carboxylic acid was converted to the corresponding acid chloride according to the following procedure.

Crown carboxylic acids (5 mmol) were added to 10 mL of dry benzene under nitrogen. At 0° C., 20 mmol oxalylchloride was added dropwise and then left to stir at room temperature for an additional hour. The reaction mixture then was stirred for 1 hour at 60°–70° C. The solvents were evaporated in vacuo, and the product was used immediately for the next step.

Second, O-benzylhydroxamates were prepared from the acid chlorides according to the following procedure.

O-Benzylhydroxylamine hydrochloride (800 mg; 5 mmol) was suspended in 10 mL of dry acetonitrile and treated with pyridine (10 mmol). The mixture was cooled to 0° C., and the acetonitrile solution containing acid chloride was added dropwise. The mixture was allowed to warm up to room temperature, and stirring was continued for 24 hours. Solvents were evaporated and the residue taken up in ethylacetate. The residue was washed twice with 0.6M HCl, once with water, once with $NaHCO_3$, and once again with water. After the mixture was dried ($MgSO_4$) and evaporated, the O-benzyl-hydroxamate was obtained.

In Example 6, sym-dibenzo-13-crown-4-oxyacetyl-o-benzylhydroxamate was obtained.

In Example 7, sym-dibenzo-16-crown-5-oxyacetyl-o-benzylhydroxamate (m.p. 112°–114° C.) was obtained in 83% yield.

In Example 8, sym-dibenzo-19-crown-6-oxyacetyl-o-benzylhydroxamate was obtained in 84% yield as an oil.

In Example 9, sym-dibenzo-16-crown-5-oxy)octadecanoyl-o-benzylhydroxamate (m.p. 75°–77° C.) was obtained in 76% yield after recrystallization from acetonitrile.

In Example 10, 2-(sym-dibenzo-16-crown-5-oxy)-phenylacetyl-o-benzylhydroxamate (m.p. 128°–130° C.) was obtained in 74% yield after recrystallization from $CH_2Cl_2$ in hexane.

EXAMPLES 11–15

These Examples illustrate the preparation of dibenzo-crown ether derivatives of hydroxamic acid from their corresponding dibenzo crown ether o-benzylhydroxamates, according to the following procedure.

O-Benzylhydroxamate (0.75 g; 2.92 mmol) in 30 mL of methanol was stirred under $H_2$ at room temperature and atmospheric pressure in the presence of 200 mg 10% Pd/C (contains 50% water) for 3–4 hours. Catalyst was filtered and methanol was evaporated. All hydroxamic acids gave positive $FeCl_3$ tests.

In Example 11, sym-dibenzo-13-crown-4-oxyacetylhydroxamic acid (m.p. 136°–137° C.) was obtained.

In Example 12, sym-dibenzo-16-crown-5-oxyacetylhydroxamic acid (m.p. 108°–110° C.) was obtained in 72% yield after recrystallization from methanol.

In Example 13, 2-(sym-dibenzo-16-crown-5-oxy)octadecanoyl hydroxamic acid (m.p. 51°–53° C.) was obtained in 74% yield after recrystallization from methanol.

In Example 14, 2-(sym-dibenzo-16-crown-5-oxy)-phenylacetylhydroxamic acid (m.p. 138°–140° C.) was obtained in 77% yield after recrystallization from ethylacetate and hexane.

In Example 15, sym-dibenzo-19-crown-6-oxyacetylhydroxamic acid (m.p. 134°–135° C.) was obtained in 88% yield after recrystallization from methanol.

EXAMPLES 16–20

These Examples illustrate the preparation of acyclic dibenzo ether derivatives of carboxylic acid, which are precursors for the preparation of the corresponding derivatives of hydroxamic acid, illustrated by formula (II). The following procedure was used to prepare the carboxylic acid derivatives.

To 1.2 g (50 mmol) of NaH, 30 mL of THF was added under nitrogen. The mixture was stirred for 30 minutes at room temperature and then 5 mmol of appropriate bisphenol dissolved in 50 mL of THF was added dropwise for 1 hour and was stirred for another hour at room temperature. After stirring, 10 mmol of the 2-bromocarboxylic acid dissolved in 50 mL of THF was slowly added over 10–12 hours. The reaction mixture was stirred for 24 hours at room temperature. Water was carefully added to destroy the excess of NaH and THF was evaporated in vacuo. The residue was dissolved in water and acidified with 6M HCl, extracted with $CH_2Cl_2$. The $CH_2Cl_2$ layer was washed, dried over $MgSO_4$ and evaporated in vacuo to give oil products which were crystallized from organic solvent. The products of Examples 16, 17 and 18 were cooled in a refrigerator.

In Example 16, 2,2'-di-oxyhexadecanoic acid phenoxy propane (m.p. 92°–94° C.) was obtained in 52% yield after recrystallization from ethanol.

In Example 17, 2,2'-di-oxyhexadecanoic acid phenoxydiethyl ether (m.p. 77°–79° C.) was prepared in 83% yield after recrystallization from n-hexane.

In Example 18, 2,2'-di-oxyhexadecanoic acid phenoxy 3,6-dioxaoctane (m.p. 67°–69° C.) was obtained in 83% yield after recrystallization from n-pentane n-hexane.

In Example 19, 2,2'-di-oxyphenylacetic acid phenoxydiethylether (m.p. 41°–43° C.) was obtained in 70% yield as an oil which crystallized after drying after separation in silica gel in vacuum with $CH_2Cl_2$:MeOH (9:1) as eluent.

In Example 20, 2,2'-di-oxyhexadecanoic acid N,N'-ethylene acetamide (m.p. 114°-116° C.) was obtained in 62% yield after recrystallization from n-pentane.

EXAMPLE 21

This Example illustrates the preparation of 2,2'-dioxyhexadecanoyl hydroxamic acid phenoxydiethyl ether from its corresponding carboxylic acid.

Exactly 1.5 mmol (1.197 g) of 2,2'-di-oxyhexadecanoic acid phenoxydiethyl ether were added to 10 mL of dry benzene under nitrogen. At 0° C., 12 mmol oxalylchloride were added dropwise and then stirred at room temperature for an additional hour. The reaction mixture then was stirred for 1 hour at 60°-70° C. The solvents were evaporated in vacuo and the acid chloride product was used immediately for the next step.

Exactly 3 mmol (0.478 g) o-benzylhydroxylamine hydrochloride was suspended in 10 mL of dry acetonitrile and treated with pyridine (6 mmol). The mixture was cooled to 0° C. and the acetonitrile solution containing acid chloride was added dropwise. The mixture was allowed to warm up to room temperature and stirred for 24 hours. Solvents were evaporated and the residue taken up in ethylacetate. The ethyl acetate solution was washed twice with 0.6M HCl, once with water, once with NaHCO$_3$, and once again with water. The mixture was dried (MgSO$_4$) and evaporated to give a white solid, which was recrystallized from ethylacetate to give 60% yield of white solid, m.p. 95°-97° C.

Exactly 0.45 mmol (450 mg) of 2,2'-di-oxyhexadecanoic hydroxamate phenoxydiethyl ether was suspended in methanol and 100 mg of talc as a catalyst. After 30 minutes, the reaction was complete. About 300 mg (80%) of 2,2'-di-oxyhexadecanoyl hydroxamic acid phenoxydiethyl ether was obtained as a white solid (m.p. 110°-112° C.) after recrystallization from methanol.

The hydroxamic acid derivatives of the present invention were evaluated for their utility as chelating agents for f-block elements in terms of both their ability to extract elements of the lactinide and actinide series and for their selectivity.

Extraction experiments were carried out with 10-mL aliquots of a lanthanide solution spiked with an appropriate amount of radioisotope in 50-mL ground-glass stoppered Erlenmeyer flasks. The pH of each solution was adjusted to a desired value using LiOH and HNO$_3$. The extraction solution was prepared by dissolving a weighed amount of the prospective chelating agent, e.g., the crown ether carboxylic acid or the crown ether hydroxamic acid in several hundred milliliters of a chloroform-heptanol mixture in a beaker with magnetic stirring. After the prospective chelating agent was completely dissolved, the organic phase was shaken with a pH 2 HCl solution to remove potential impurities. After washing, the organic phase was kept in contact with a small amount of water to which LiOH was added to maintain a neutral solution (pH 7). To each aqueous lanthanide ion sample, 10 mL of this extraction solution was added. The mixtures were shaken vigorously on a mechanical wrist-action shaker (Burrell Model 75) for several minutes at room temperature. After shaking, the mixtures were allowed to stand for a period of time for phase separation. Five milliliters each of the organic and the aqueous phase were then removed from the flask and placed in 10-mL glass vials with fast-turn caps for γ counting. Normally, a total of $10^3$–$10^4$ counts were collected from each measurement. The statistical errors associated with the radioactivity measurements were 1-3%. The final equilibrium pH of the aqueous phase was also measured with the semimicro glass electrode.

The results of the extraction studies are set forth in Tables I and II.

Table I illustrates extraction efficiency and selectivity of dibenzo-16-crown-5-ether derivatives of hydroxamic acid represented by formula (I) above, for the extraction of lanthanum and lutetium ion from a sample according to the extraction protocol described above.

TABLE I

| R | pH | $D_{Lu}$ | $D_{La}$ | $D_{Lu}/D_{La}$ |
|---|---|---|---|---|
| H | 5.1 | 3.14 | 0.09 | 34.8 |
|   | 5.5 | 22.6 | 0.15 | 150.6 |
|   | 6.2 | 194 | 16.7 | 12.6 |
|   | 6.6 | 475 | 72.6 | 6.5 |
|   | 7.3 | 842 | 176 | 4.8 |
| C$_6$H$_5$ | 6.32 | 147 | 0.250 | 588 |
|   | 6.6 | 116 | 0.0477 | 2432 |
|   | 6.9 | 335 | 0.266 | 1259 |
|   | 7.15 | 2240 | 20.3 | 110 |
| C$_{10}$H$_{21}$ | 6.40 | 22.7 | 0.014 | 1609 |
|   | 6.83 | 36.4 | 0.46 | 79 |
|   | 6.94 | 926 | 1.94 | 477.3 |
| C$_{16}$H$_{33}$ | 6.3 | 104 | 0.213 | 488 |
|   | 6.8 | 395 | 3.55 | 111 |

Table II illustrates extraction efficiency and selectivity of dibenzo-16-crown-5-ether derivatives of carboxylic acid, for the extraction of lanthanum and lutetium ion from a sample according to the protocol described above.

TABLE II

| R | pH | $D_{Lu}$ | $D_{La}$ | $D_{Lu}/D_{La}$ |
|---|---|---|---|---|
| H | 6.5 | 19.6 | 3.0 | 6.5 |
| H | 6.5 | 7.2 | 1.1 | 6.5 |
| C$_6$H$_5$ | 6.58 | 7.98 | 0.345 | 23.1 |
| C$_6$H$_5$ | 7.0 | 24.1 | 13.2 | 1.83 |
| C$_{10}$H$_{21}$ | 6.57 | 3.46 | 0.174 | 9.90 |
| C$_{10}$H$_{21}$ | 7.0 | 11.6 | 1.49 | 7.79 |

The comparative data illustrates the greater extraction efficiency and greater selectivity of the hydroxamic acid derivatives of the present invention in comparison to the corresponding carboxylic acid derivatives.

Table III illustrates extraction efficiency and selectivity of an acyclic dibenzo ether derivative of a hydroxamic acid represented by formula (II) wherein Y is (CH$_2$CH$_2$OCH$_2$CH$_2$) and R is C$_{14}$H$_{29}$ for the extraction of lanthanum and lutetium ion from a sample according to the protocol described above. For comparison purposes, the extraction and selectivity data for the corresponding carboxylic acid is also set forth.

TABLE III

|  | pH | $D_{Lu}$ | $D_{La}$ | $D_{Lu}/D_{La}$ |
|---|---|---|---|---|
| hydroxamic acid | 5.12 | 971 | 1 | 907 |
|  | 5.8 | 1680 | 19 | 88 |
|  | 7.1 | 8969 | 2329 | 3.85 |
| carboxylic acid | 6.51 | 187 | 97 | 1.92 |
|  | 7.00 | 103 | 71 | 1.42 |

The comparative data illustrates the greater extraction efficiency and greater selectivity of the hydroxamic acid derivatives of the present invention in comparison to the corresponding carboxylic acid derivatives.

The hydroxamic acid derivatives of the present invention are useful chelating agents for the chelation of f-block elements of the Periodic Table, that is, elements of the lanthanide and actinide series, as well as yttrium and scandium. The hydroxamic acids are thus useful for the extraction of f-block elements, yttrium and scandium especially from aqueous media. The hydroxamic acids of this invention find utility in the extraction of f-block elements, yttrium and scandium from ground water, including potable water, for the clean-up of hazardous waste, and for the recovery of the f-block elements, yttrium and scandium from ores and minerals.

The hydroxamic acid based chelating agents may be used in any of the methods commonly employed to carry out extractions of metal ions. For example, the hydroxamic acid derivatives may be used in typical aqueous-ion liquid-liquid extractions, which, as is known, may be batch, continuous, co-current or countercurrent. The hydroxamic acid derivatives may also be used in solid-liquid phase extractions.

We claim:

1. A dibenzo crown ether derivative of a hydroxamic acid represented by the formula:

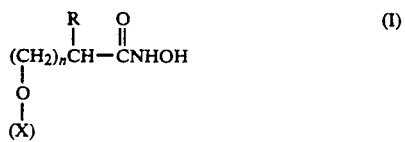

wherein X is a dibenzo crown ether of the formula dibenzo {13+3m} crown {4+m} ether, and m is an integer of from 0 to about 5, n is an integer of from 0 to 6 and R is H or a lipophilic hydrocarbyl group having from 1 to about 18 carbon atoms and is selected from the group consisting of alkyl, cycloalkyl, alkenyl and aryl groups.

2. The compound of claim 1 wherein said dibenzo crown ether is a member selected from the group consisting of (i) dibenzo-13-crown-4 ether, (ii) dibenzo-16-crown-5 ether and (iii) dibenzo-19-crown-6 ether.

3. The compound of claim 1 wherein said hydrocarbyl group has from about 6 to about 10 carbon atoms.

4. The compound of claim 2 wherein said hydrocarbyl group is an alkyl group having from about 6 to about 10 carbon atoms.

5. The compound of claim 1 wherein said hydrocarbyl group is phenyl.

6. The compound of claim 2 wherein said hydrocarbyl group is phenyl.

7. The compound of claim 6 wherein said phenyl group is substituted with at least on electron withdrawing group or at least one electron donating group.

8. An acyclic dibenzo ether derivative of a hydroxamic acid represented by the formula:

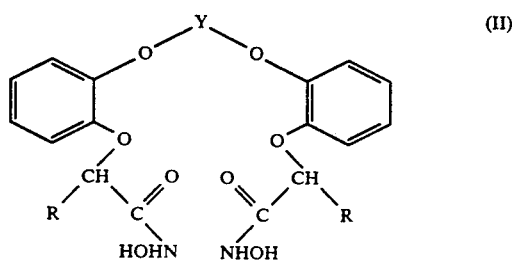

wherein Y is a member selected from the group consisting of (CH$_2$)$_3$,

[(CH$_2$CH$_2$O)$_n$CH$_2$CH$_2$]

wherein n is an integer of from 1 to about 4, and CH$_2$CONHCH$_2$CH$_2$NHCOCH$_2$; and R, which may be the same or different, is selected from the group consisting of H, and a hydrocarbyl group having from 1 to about 18 carbon atoms and selected from the group consisting of alkyl, cycloalkyl, alkenyl and aryl groups.

9. The compound of claim 8 wherein said hydrocarbyl group has from about 6 to about 10 carbon atoms.

10. The compound of claim 8 wherein said hydrocarbyl group is phenyl.

11. The compound of claim 9 wherein said hydrocarbyl group is phenyl.

12. The compound of claim 10 wherein said phenyl group is substituted with at least one electron withdrawing group.

13. The compound of claim 12 wherein said electron withdrawing group is fluorine.

14. The compound of claim 10 wherein said phenyl group is substituted with at least one electron donating group.

15. The compound of claim 11 wherein said phenyl group is substituted with at least one electron withdrawing group.

16. The compound of claim 15 wherein said electron withdrawing group is fluorine.

17. The compound of claim 16 wherein said phenyl group is substituted with at least one electron donating group.

18. The compound of claim 8 wherein Y is [(CH$_2$CH$_2$O)$_n$CH$_2$CH$_2$] and n is 1.

19. The compound of claim 8 wherein Y is [(CH$_2$CH$_2$O)$_n$CH$_2$CH$_2$] and n is 2.

20. The compound of claim 8 wherein Y is (CH$_2$)$_3$.

21. The compound of claim 8 wherein Y is CH$_2$CONHCH$_2$CH$_2$NHCOCH$_2$.

22. The compound of claim 18 wherein said hydrocarbyl group is an alkyl group having from about 6 to about 10 carbon atoms.

23. The compound of claim 18 wherein said hydrocarbyl group is phenyl.

24. The compound of claim 19 wherein said hydrocarbyl group is an alkyl group having from about 6 to about 10 carbon atoms.

25. The compound of claim 1 wherein said hydrocarbyl group is phenyl.

26. The compound of claim 25 wherein said phenyl group is substituted with at least one electron withdrawing group.

27. The compound of claim 26 wherein said electron withdrawing group is fluorine.

28. The compound of claim 25 wherein said phenyl group is substituted with at least one electron donating group.

29. A bis-dibenzo crown ether derivative of a hydroxamic acid represented by the formula:

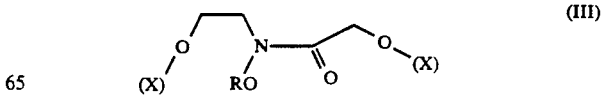

wherein X is a dibenzo crown ether of the formula dibenzo{13+3m}crown{4+m}ether and m is an integer of from 0 to about 5, and X may be the same or different, and R is hydrogen or a lipophilic hydrocarbyl group having from 1 to about 18 carbon atoms and is selected from the group consisting of alkyl, cycloalkyl, alkenyl and aryl groups.

30. The compound of claim 29 wherein said dibenzo crown ether is a member selected from the group consisting of dibenzo-13-crown-4 ether, dibenzo-16-crown-5 ether, and dibenzo-19-crown-6 ether.

31. The compound of claim 29 wherein said hydrocarbyl group has from about 6 to about 10 carbon atoms.

32. The compound of claim 30 wherein said hydrocarbyl group is an alkyl group having from about 6 to about 10 carbon atoms 33. The compound of claim 29 wherein said hydrocarbyl group is phenyl.

34. The compound of claim 30 wherein said hydrocarbyl group is phenyl.

35. The compound of claim 34 wherein said phenyl group is substituted with at least one electron withdrawing group or at least one electron donating group.

36. A hydroxamic acid derivative of the formula:

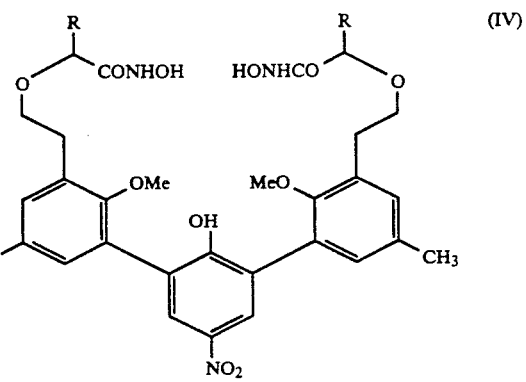

wherein R is H or a hydrocarbyl group having from 1 to about 18 carbon atoms and selected from the group consisting of alkyl, cycloalkyl, alkenyl and aryl groups.

* * * * *

UNITED STATES PATENT AND TRADEMARK OFFICE
CERTIFICATE OF CORRECTION

PATENT NO. : 5,274,129
DATED : December 28, 1993
INVENTOR(S) : NICHOLAS R. NATALE, CHIEN M. WAI AND SADIK ELSHANI It is certified that error appears in the above-identified patent and that said Letters Patent is hereby corrected as shown below:

Column 6, line 34, "6M" is "6 M";

Column 7, lines 17 & 50, "6M" is "6 M"; and

Column 9, line 25, "6M" is "6 M".

Column 12, line 49, delete "1" and substitute therefor -- 19 --; and

Column 12, line 67, delete "dibenzo +13 + 3m +crown +4 + m +ether" and insert -- dibenzo-[13 + 3m]-crown-[4 + m]-ether --.

Signed and Sealed this

Thirteenth Day of December, 1994

Attest:

BRUCE LEHMAN

*Attesting Officer*     *Commissioner of Patents and Trademarks*